(12) United States Patent
Rockwell et al.

(10) Patent No.: US 9,637,112 B2
(45) Date of Patent: May 2, 2017

(54) VEHICLE PERFORMANCE PRELOAD ENABLER

(71) Applicant: Ford Global Technologies, LLC, Dearborn, MI (US)

(72) Inventors: Mark Anthony Rockwell, Wyandotte, MI (US); Justin Reuel Badger, Plymouth, MI (US); Christopher Michael Kava, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/671,393

(22) Filed: Mar. 27, 2015

(65) Prior Publication Data

US 2016/0280207 A1    Sep. 29, 2016

(51) Int. Cl.
| | |
|---|---|
| *B60K 6/20* | (2007.10) |
| *B60L 11/18* | (2006.01) |
| *B60W 10/06* | (2006.01) |
| *B60W 10/08* | (2006.01) |
| *B60W 20/13* | (2016.01) |

(52) U.S. Cl.
CPC .............. *B60W 20/13* (2016.01); *B60K 6/20* (2013.01); *B60L 11/1809* (2013.01); *B60L 11/1874* (2013.01); *B60W 10/06* (2013.01); *B60W 10/08* (2013.01); *B60W 2510/244* (2013.01); *B60W 2710/06* (2013.01); *B60W 2710/08* (2013.01); *B60Y 2300/60* (2013.01); *B60Y 2300/91* (2013.01); *Y02T 10/6286* (2013.01); *Y02T 10/7005* (2013.01); *Y10S 903/93* (2013.01)

(58) Field of Classification Search
CPC ...... B60W 20/13; B60W 10/06; B60W 10/08; B60W 2510/244; B60K 6/20; B60L 11/1809; B60L 11/1874; Y02T 10/7005; Y02T 10/70044
USPC ...... 701/22, 102; 180/65.265, 65.285, 65.29, 180/65.23; 903/930
See application file for complete search history.

(56) References Cited

U.S. PATENT DOCUMENTS

| | | | |
|---|---|---|---|
| 8,755,960 B2 * | 6/2014 | McGrogan | ............... B60K 6/48 180/65.29 |
| 2008/0306670 A1 * | 12/2008 | Masterson | ............... B60K 6/26 701/99 |
| 2011/0307130 A1 | 12/2011 | Gow et al. | |
| 2012/0209499 A1 | 8/2012 | Russell | |

(Continued)

*Primary Examiner* — Marthe Marc-Coleman
(74) *Attorney, Agent, or Firm* — David B. Kelley; Brooks Kushman P.C.

(57) ABSTRACT

A hybrid vehicle includes a traction battery having a battery fan, an engine, an electric machine coupled to the battery, and a controller or at least one powertrain module having a controller. The controller is programmed to respond to a change in a user selected powertrain operating mode to a performance mode. This change may occur while a pedal demand is generally constant. The controller may increase an available power of the battery to drive the electric machine without altering state of charge operating limits of the battery. The increase in available power of the battery may include increasing a state of charge of the battery or reducing the battery temperature such that a current may flow from the battery for a longer time period. Also, the overall available power for the vehicle may include operation of the engine at a higher rotational speed.

16 Claims, 4 Drawing Sheets

(56) References Cited

U.S. PATENT DOCUMENTS

| | | | |
|---|---|---|---|
| 2012/0286591 A1* | 11/2012 | Schiemann | H02J 7/0026 307/130 |
| 2013/0006458 A1 | 1/2013 | Bhattarai et al. | |
| 2014/0004994 A1 | 1/2014 | Wang et al. | |
| 2014/0172206 A1* | 6/2014 | Roos | B60K 6/442 701/22 |

* cited by examiner

VEHICLE PERFORMANCE PRELOAD ENABLER

TECHNICAL FIELD

This application generally relates to vehicle power management based on selection of a performance mode to preload a powertrain system in anticipation of a power request.

BACKGROUND

A hybrid-electric vehicle includes an engine, a generator coupled to the engine, and a traction battery. The traction battery provides power for vehicle propulsion and accessory features. During operation, the traction battery may be charged or discharged based on the operating conditions including a battery state of charge (SOC), driver demand and regenerative braking.

SUMMARY

A vehicle powertrain control system includes a traction battery, an electric machine, and a controller. The electric machine is electrically coupled to the battery. The controller is programmed to respond to a change in a user selected powertrain operating mode to a performance mode while a pedal demand is generally constant. The response of the controller is to increase an available power of the battery to drive the electric machine without altering state of charge operating limits of the battery.

A method of operating a vehicle powertrain system includes increasing an available power of a traction battery. The increasing is in response to a change of a powertrain mode switch to an emergency mode without altering state of charge operating limits of the battery.

A vehicle powertrain control system includes a traction battery, a powertrain mode selector, an electric machine, and a controller. The powertrain mode selector includes a performance mode. The electric machine is electrically coupled to the battery. The controller is programmed to respond to a selection of a performance mode while a pedal demand is generally constant. The response of the controller is to increase an available power of the battery to drive the electric machine without altering state of charge operating limits of the battery.

DETAILED DESCRIPTION

Figure 1:
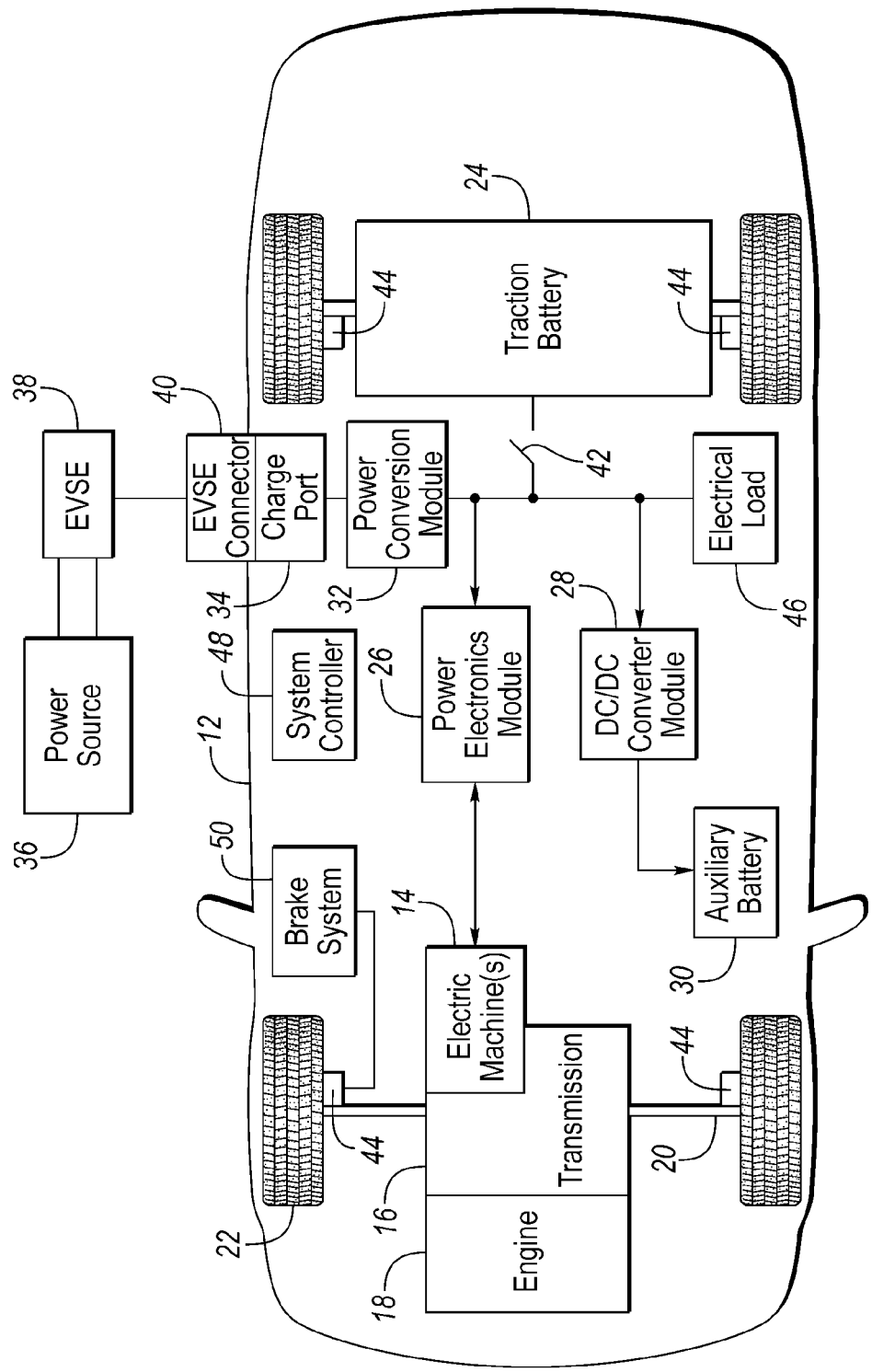
FIG. 1 is an exemplary diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Some hybrid-electric vehicles include a powertrain mode selection switch that allows a vehicle operator to adjust powertrain characteristics during a drive cycle. Selections of the powertrain mode selection switch may include an economy mode, a normal mode and a performance mode. The economy mode is typically calibrated to sacrifice performance for an increase in fuel economy. The normal mode may be a balance between fuel economy and performance. The performance mode may sacrifice fuel economy for vehicle performance. In the performance mode, the sacrifice of fuel economy for performance may be tempered by driver comfort requirements such as reduced vibration and reduced interior cabin noise. The noise and vibration reduction methods include limitations of an operating time of an engine, a noise-vibration-harshness limitation of a speed of an engine, limitations on an operating time of a battery fan, and a limitation of a speed of a battery fan. For example, the limitation of the operating time of an engine may include stopping an engine when the vehicle is not in motion, such as at a stop light or in a parking lot, or stopping the engine when the traction battery SOC is greater than a battery low threshold. Further, vehicle operation during performance mode may be qualified by a pedal demand event. An example of the noise-vibration-harshness (NVH) limitation of a speed of an engine may include electronically limiting the speed of the engine to less than a NVH limit that is less than a maximum engine speed. An example of limitations on an operating time of a battery fan may include stopping fan operation unless the battery temperature exceeds a high battery temperature threshold. And an example of the limitation of a speed of the battery fan includes operating the fan at a speed that reduces the noise generated by the fan such that a decibel level of the fan noise is less than a noise decibel threshold.

A performance mode for law enforcement or operation on a track is likely different from a driver's performance requirements on a public street. A performance mode configured for a public street is hereafter referred to as "street-performance mode". Here, a pursuit mode or track mode hereafter referred to as "performance mode", "emergency mode", "track mode" or "pursuit mode", is disclosed which prioritizes performance over driver comfort requirements. The intent is for a driver on a track or a law enforcement officer during law enforcement operations including emergency response activities to have the maximum amount of energy available. Here, available powertrain power is increased in anticipation of a future pedal demand event. The increase in available powertrain power is analogous to winding a spring in anticipation of needing the powertrain power or powertrain energy at a future point. This increase in powertrain power may include increasing the charge in the battery (e.g., battery state of charge) and reducing the battery temperature such that a current may flow from the battery for an increased period of time.

In the performance mode, the engine will operate until the battery is fully charged; this includes operating the engine when the vehicle is not in motion and operating the engine when the battery state of charge (SOC) is above a low SOC threshold. Also, other driver comfort requirements may be sacrificed including shutting off a battery fan when the battery temperature is below a low battery threshold and operating the battery fan at a speed greater than a noise limited speed.

A battery fan will operate if the battery temperature is above a performance battery temperature. A threshold of operating a battery fan is a normal battery temperature which is typically set to keep the battery from overheating. The battery fan operation is limited to maintaining the battery temperature at the normal battery temperature to reduce the noise associated with the battery operation. Here, the battery fan is operated to reduce the battery temperature to a performance battery temperature which is less than the normal battery temperature. Also, the battery fan may be operated at a battery fan speed greater than a noise-vibration-harshness-fan speed to allow greater airflow and cooling of the battery. This reduction in battery temperature allows a battery to generate more heat from the discharging of a current from the battery before reaching a maximum battery temperature. This allows the battery to flow a current for an increased period of time resulting in an increase in available power from the battery.

FIG. 1 depicts a typical plug-in hybrid-electric vehicle (PHEV) having a powertrain or powerplant that includes the main components that generate power and deliver power to the road surface for propulsion. A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an internal combustion engine 18 also referred to as an ICE or engine. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. A powertrain has losses that may include transmission losses, engine losses, electric conversion losses, electric machine losses, electrical component losses and road losses. These losses may be attributed to multiple aspects including fluid viscosity, electrical impedance, vehicle rolling resistance, ambient temperature, temperature of a component, and duration of operation.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle, a hybrid-electric vehicle or a plug-in hybrid-electric vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 or auxiliary electric loads may be connected to the high-voltage bus. The electrical loads 46 may have an associated controller that operates and controls the electrical loads 46 when appropriate. Examples of auxiliary electric loads or electrical loads 46 include a battery cooling fan, an electric air conditioning unit, a battery chiller, an electric heater, a cooling pump, a cooling fan, a window defrosting unit, an electric power steering system, an AC power inverter, and an internal combustion engine water pump.

The various components discussed may have one or more associated controllers to control and monitor the operation of the components. The controllers may communicate via a serial bus (e.g., Controller Area Network (CAN), Ethernet, Flexray) or via discrete conductors. A system controller 48 may be present to coordinate the operation of the various components.

Figure 2:
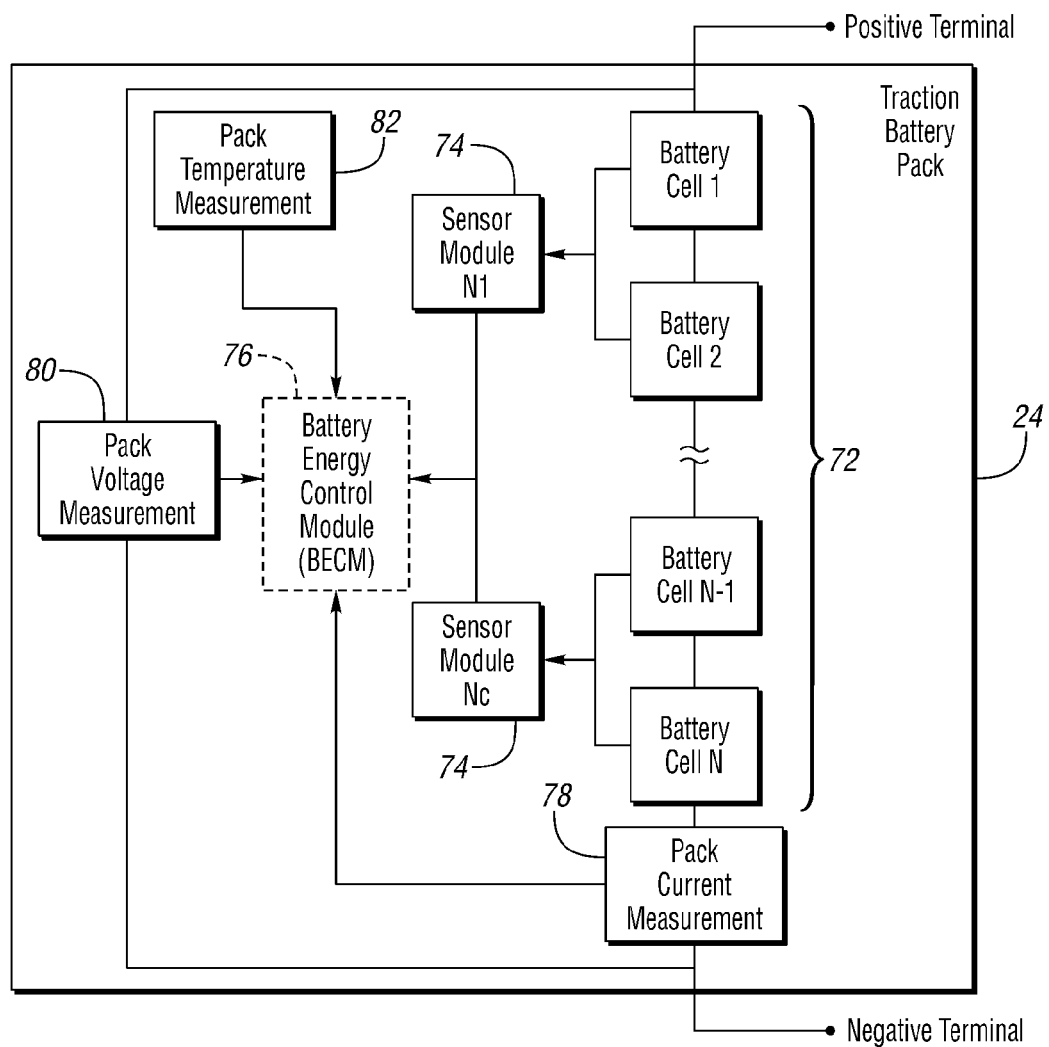
FIG. 2 is an exemplary diagram of a battery pack controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have a one or more controllers, such as a Battery Energy Control Module (BECM) 76 that monitors and controls the performance of the traction battery 24. The BECM 76 may include sensors and circuitry to monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell level characteristics that are measured and monitored. For example, the terminal voltage, current, and temperature of each cell 72 may be measured. The battery management system may use a sensor module 74 to measure the battery cell characteristics. Depending on the capabilities, the sensor module 74 may include sensors and circuitry to measure the characteristics of one or multiple of the battery cells 72. The battery management system may utilize up to N, sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Battery pack state of charge (SOC) gives an indication of how much charge remains in the battery cells 72 or the battery pack 24. The battery pack SOC may be output to inform the driver of how much charge remains in the battery pack 24, similar to a fuel gauge. The battery pack SOC may also be used to control the operation of an electric or hybrid-electric vehicle 12. Calculation of battery pack SOC can be accomplished by a variety of methods. One possible method of calculating battery SOC is to perform an integration of the battery pack current over time. This is well-known in the art as ampere-hour integration.

The BECM 76 may have power available at all times. The BECM 76 may include a wake-up timer so that a wake-up may be scheduled at any time. The wake-up timer may wake up the BECM 76 so that predetermined functions may be executed. The BECM 76 may include non-volatile memory so that data may be stored when the BECM 76 is powered off or loses power. The non-volatile memory may include Electrical Eraseable Programmable Read Only Memory (EEPROM) or Non-Volatile Random Access Memory (NVRAM). The non-volatile memory may include FLASH memory of a microcontroller.

The battery pack 24 may also include a battery fan (not shown) configured to flow air throughout the battery pack 24 so that a temperature of the battery cells 72 and electronics in the battery pack 24 can be regulated. The BECM 74 may monitor the temperature of the battery cells 72 using a temperature sensor signal from the pack temperature measurement 82. In response to the temperature sensor signal, the BECM 74 may generate a signal to operate the battery fan.

Figure 3:
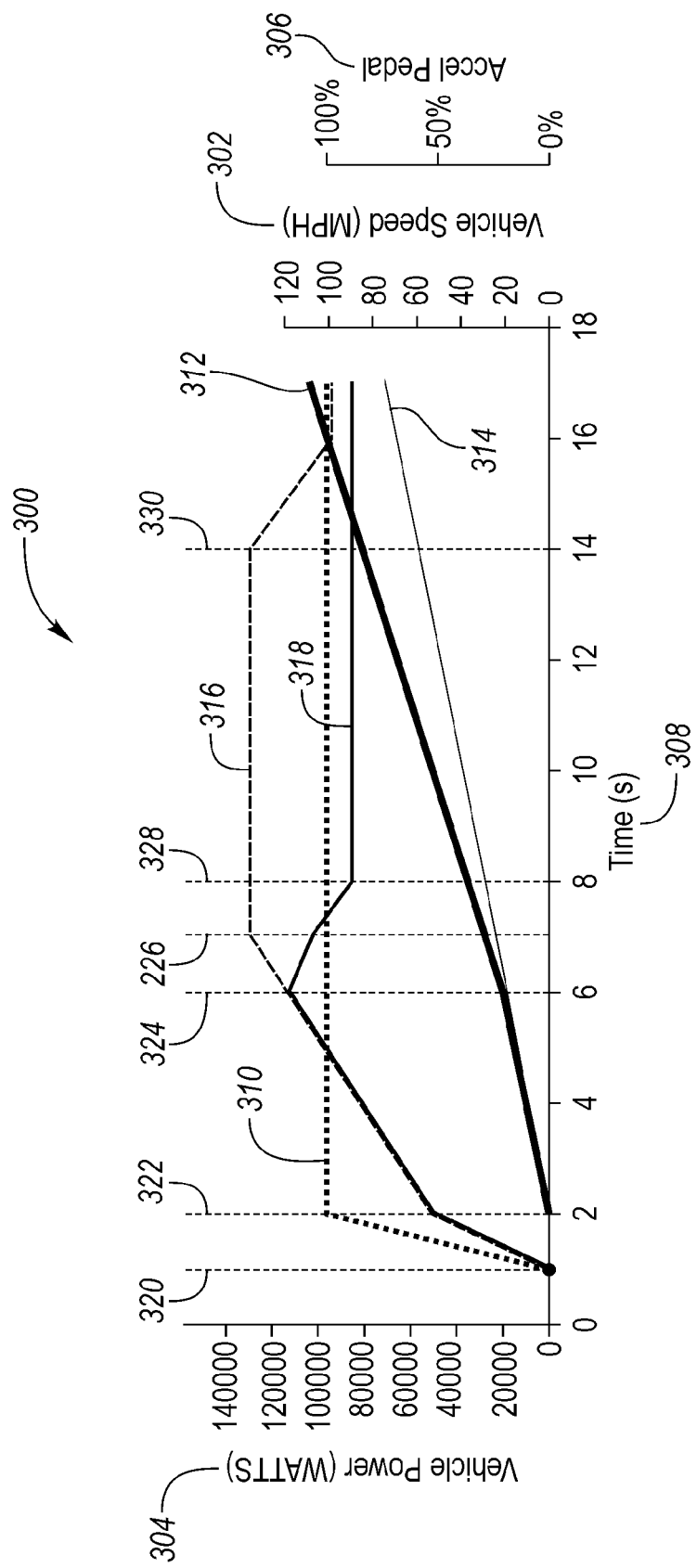
FIG. 3 is an exemplary graph that illustrates accelerator pedal demand, vehicle speed and vehicle power in relation to time.

FIG. 3 is an exemplary graph 300 that illustrates vehicle speed 302, vehicle power 304, and accelerator pedal demand 306 in relation to time 308. Here in response to a pedal demand 310, a performance mode vehicle speed 312 is shown to be greater than a street-performance mode vehicle speed 314 after a period of time. Likewise, a performance mode vehicle power 316 is shown to be greater than a street-performance mode vehicle power 318 due to many factors, some of the factors include an increased battery SOC, a decreased battery temperature, and an increased engine RPM limit in the performance mode in comparison to the street-performance mode. One aspect of the increased performance is that during a standby state of the performance mode, the vehicle may operate the engine to charge the battery and operate the battery fan to cool the battery. The standby state is a state when a pedal demand is not present including a time period in which the vehicle is not in motion such as stopped at a traffic light. At point 320, a pedal demand is initiated and the pedal demand is increased to a maximum pedal demand at point 322. A powertrain system may typically have a delay between an increase in pedal demand and power due to powertrain wind-up as show between points 320 and 322. Between points 322 and 324 the vehicles accelerate equally in both the performance mode and the street-performance mode being propelled by both the engine and the motors driven by the traction battery. At point 324, the power available in street-performance mode is limited by the battery electronic control module. This limitation may be in response to the battery temperature increasing beyond a threshold or the battery SOC dropping below a threshold. At point 326, the powertrain power is further limited decreasing vehicle accelerate and the resultant vehicle speed. Vehicle power remains constant for a period between 328 and 330 for both street-performance and performance modes. However the performance mode level is greater than the street-performance mode level due to many factors including the ability of the battery to supply a current for a greater period of time due to a higher starting SOC and/or a lower starting battery temperature, and the ability of the engine to operate at a higher speed due to an increases RPM limit. The result is greater performance in is factors allow for greater continued acceleration and vehicle speed.

Figure 4:
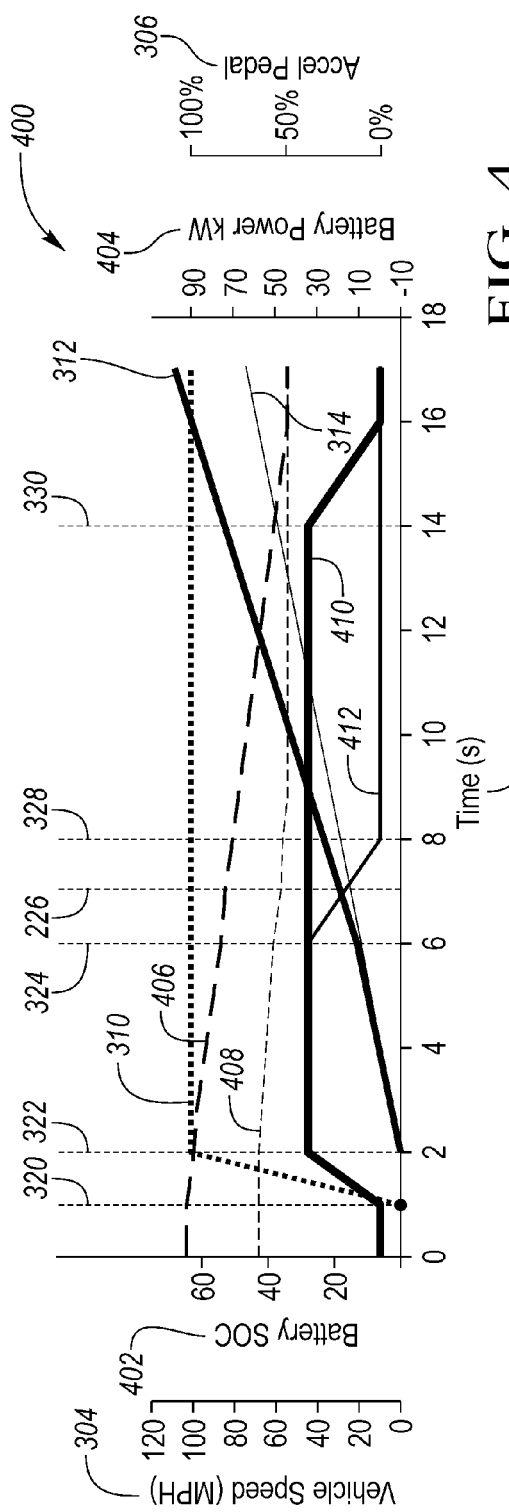
FIG. 4 is an exemplary graph that illustrates accelerator pedal demand, vehicle speed, battery SOC and battery power in relation to time.

FIG. 4 is an exemplary graph 400 that illustrates pedal demand 306, vehicle speed 304, battery SOC 402 and battery power 404 in relation to time 308. In this example, the performance mode battery SOC 406 is greater than a normal mode battery SOC 408 due to engine operation during the standby state of the performance mode prior to the pedal demand event 310. A result of the greater battery SOC and a lower temperature of the battery during performance mode, the battery power 410 is greater than the battery power during normal mode 412. The increase in available power may include an ability of the battery to flow a current for an extended period of time.

Figure 5:
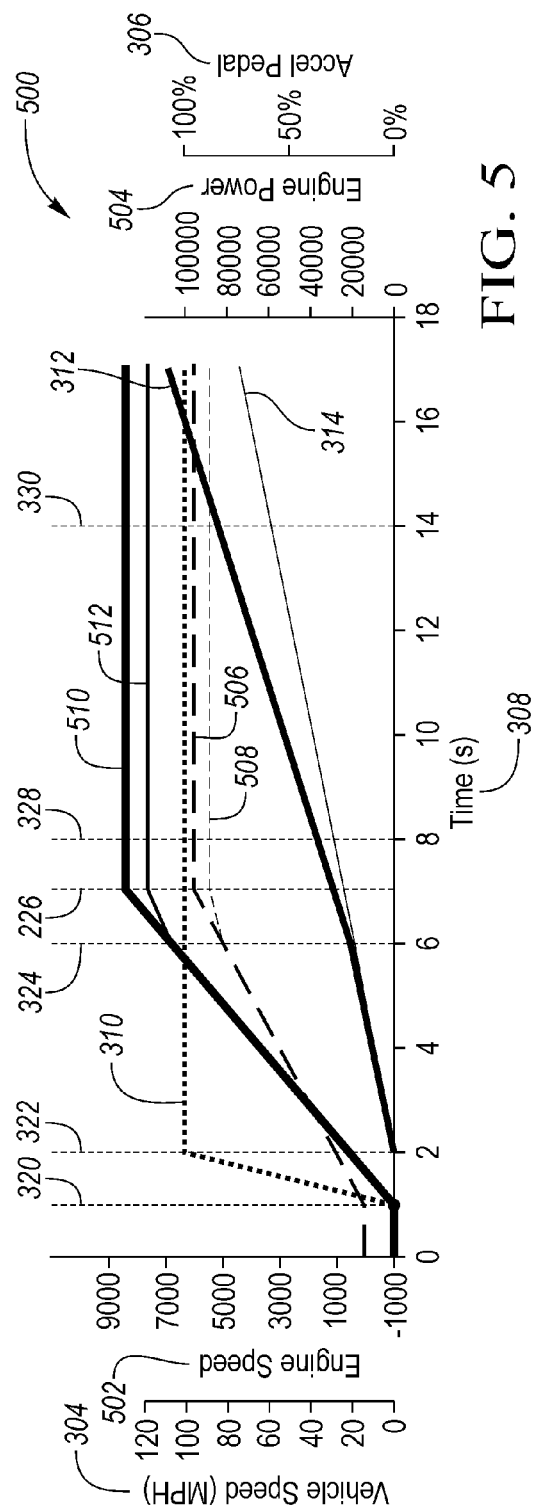
FIG. 5 is an exemplary graph that illustrates accelerator pedal demand, vehicle speed, engine speed and engine power in relation to time.

FIG. 5 is an exemplary graph 500 that illustrates pedal demand 306, vehicle speed 302, engine speed 502 and engine power 504 in relation to time. The performance mode engine power 506 is greater than the normal mode engine power 508. The increase is based on an increased performance mode engine speed limit 510 or performance engine RPM limit in respect to the normal mode engine speed limit 512. The performance mode engine limit may be a maximum engine speed. Typically a hardware limit of a speed of an engine or maximum engine speed is determined based on design limits and empirical data. Then based on testing and consumer feedback a street-performance maximum RPM limit may be set for the street-performance mode to reduce to associated noise and vibrations. This street-performance maximum RPM limit is less than the maximum RPM. Thus, in performance mode or emergency mode, the engine limit may be increased above a noise-vibration-harshness threshold (NVH) to a maximum engine speed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain control system comprising:
   a traction battery;
   an electric machine electrically coupled to the battery; and
   a controller programmed to, in response to a change in a user selected powertrain operating mode to a performance mode while a pedal demand is generally constant, increase an available power of the battery to drive the electric machine without altering state of charge operating limits of the battery.

2. The system of claim 1, wherein increasing the available power of the battery to drive the electric machine includes operating a battery-cooling fan to reduce a temperature of the battery to a performance-battery-temperature target in response to the temperature being greater than the performance-battery-temperature target, wherein the performance-battery-temperature target is less than a normal-operational-temperature target.

3. The system of claim 1, wherein increasing the available power of the battery to drive the electric machine includes operating a battery-cooling fan at a speed greater than a fan-noise-vibration-harshness-threshold speed.

4. The system of claim 1, wherein increasing the available power of the battery to drive the electric machine includes setting a battery state-of-charge (SOC) target to a performance-mode-SOC target, and operating an engine to charge the SOC to the performance-mode-SOC target when the SOC is less than the performance-mode-SOC target.

5. The system of claim 1, wherein the controller is further programmed to set an engine-RPM limit to a pursuit limit, wherein the pursuit limit is greater than an engine-noise-vibration-harshness-threshold-RPM limit.

6. The system of claim 1, wherein increasing the available power of the battery to drive the electric machine includes an increase in a time period for which a maximum battery power is available to drive the electric machine.

7. A method of operating a vehicle powertrain system comprising:
   in response to a controller receiving a selection of an emergency mode from a powertrain mode selector, increasing by the controller an available power of a traction battery to drive an electric machine that is electrically coupled to the battery without altering state of charge operating limits of the battery.

8. The method of claim 7, wherein increasing an available power of a traction battery includes turning on a battery cooling fan to reduce a temperature of the battery to a performance-battery-temperature target in response to the temperature being greater than the performance-battery-temperature target, wherein the performance-battery-temperature target is less than a normal-operational-temperature target.

9. The method of claim 8, wherein the battery cooling fan is operated at a speed greater than a noise-vibration-harshness-fan threshold.

10. The method of claim 7, wherein increasing an available power of a traction battery includes turning on an engine to charge a SOC to a performance-mode-SOC target when the SOC is less than the performance-mode-SOC target.

11. A vehicle powertrain control system comprising:
a traction battery;
a powertrain mode selector including a performance mode;
an electric machine electrically coupled to the battery; and
a controller programmed to, in response to a selection of the performance mode while a pedal demand is generally constant, increase an available power of the battery to drive the electric machine without altering state of charge operating limits of the battery.

12. The system of claim 11, wherein increasing the available power of the battery to drive the electric machine includes operating a battery-cooling fan to reduce a temperature of the battery to a performance-battery-temperature target in response to the temperature being greater than a performance-battery-temperature target, wherein the performance-battery-temperature target is less than a normal-operational-temperature target.

13. The system of claim 11, wherein increasing the available power of the battery to drive the electric machine includes operating a battery-cooling fan at a speed greater than a fan-noise-vibration-harshness-threshold speed.

14. The system of claim 11, wherein increasing the available power of the battery to drive the electric machine includes setting a battery state-of-charge (SOC) target to a performance-mode-SOC target, and operating an engine to charge the SOC to the performance-mode-SOC target when the SOC is less than the performance-mode-SOC target.

15. The system of claim 11, wherein the controller is further programmed to set an engine-RPM limit to a pursuit limit, wherein the pursuit limit is greater than an engine-noise-vibration-harshness-threshold-RPM limit.

16. The system of claim 11, wherein increasing the available power of the battery to drive the electric machine includes an increase in a time period for which a maximum battery power is available to drive the electric machine.

* * * * *